July 2, 1940.  D. L. BALLARD  2,206,760

CALCULATING DEVICE FOR REGRADING A SET OF MARKS

Filed April 4, 1939

Inventor
Delmont L. Ballard
By Clayton L. Jenks
Attorney

Witness
Wm. D. McKeon

Patented July 2, 1940

2,206,760

UNITED STATES PATENT OFFICE 2,206,760

CALCULATING DEVICE FOR REGRADING A SET OF MARKS

Delmont L. Ballard, Worcester, Mass.

Application April 4, 1939, Serial No. 265,955

1 Claim. (Cl. 235—61)

This invention relates to a calculating device and more particularly to a device for regrading a set of marks, such as the initial marks applied by a school teacher to the pupils' examination papers.

It frequently happens that a written examination given to pupils in a school is either too hard or too easy for making a satisfactory test of the students' knowledge. If the average of all of the papers is found to be quite low, then this indicates either that the test is too hard or that the pupil's work throughout the term has not been satisfactory or that the teacher himself has failed in some particular. Hence, after the teacher has inspected the marks first applied to the set of school papers, he may find it fair and desirable to change the marks on the various papers, either to raise or to lower them, and thus to provide a set of adjusted grade marks which is considered more commensurate of the knowledge of the pupils.

A primary object of this invention is, therefore, to provide a calculating device which will make such an adjustment of a given set of marks, and which will regrade all of the marks in accordance with a mathematical formula, so that the new set of adjusted marks will be fair and a more nearly accurate representation of the grade to be established. Further objects will be apparent in the following disclosure.

In accordance with my invention, I have provided a device having a graduated scale line arranged to represent the initially applied marks and a second graduated scale line which is not parallel to the first and represents the regraded marks, and further comprising an indicator having a straight line thereon so mounted as to move across the linear scales whereby a given mark on the first scale may be translated into a mark represented by the intersection of the indicator line with the second scale line. The two linear scales representing the initial and the adjusted marks are preferably so arranged that they may be moved relative to each other, such as by pivotally swinging one relative to the other, so that the indicator line may be set to translate a mark on the first scale to any desired mark on the second scale.

Referring to the drawing.

Figure 1:
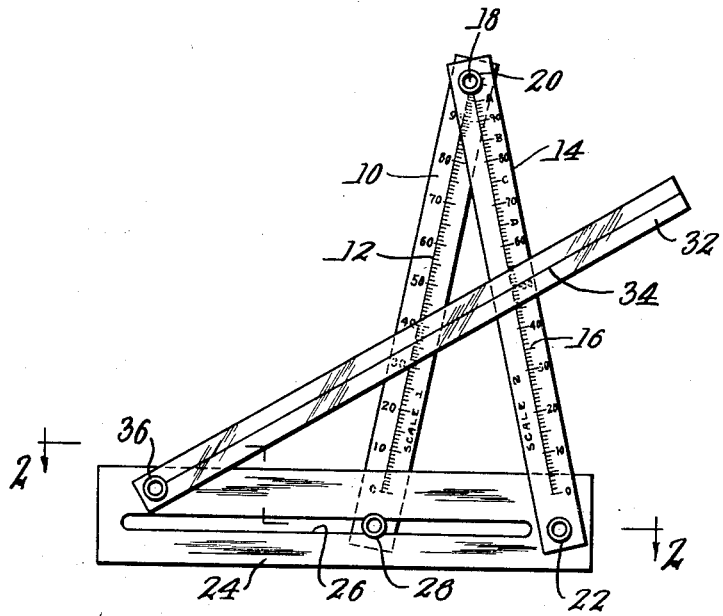
Fig. 1 is a plan view of the preferred form of device embodying the principles of my invention.
Figure 2:
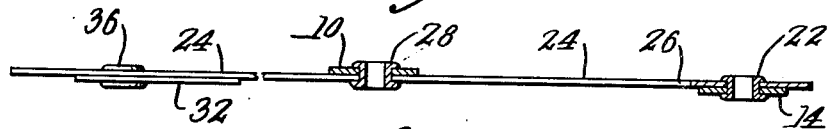
Fig. 2 is a fragmentary section on the line 2—2 of Fig. 1.

As shown in the drawing, a preferred form of the device comprises a scale arm 10, made of suitable material, such as transparent Celluloid, paper, fibre board, or various resinoids, which has a scale line 12 and suitable graduations marked thereon, such as the evenly spaced marks of 0 to 100, as illustrated. Similarly, a second scale member 14 made of the same or other suitable material is provided with an indicating line 16 lengthwise thereof, together with graduation or score marks from 0 to 100, or any other suitable scale as desired. The two scale arms are preferably of the same length, and their scale graduations may be as desired, but are shown as equal. In order that the two scale arms may be relatively adjusted and held in desired positions, they may be pivoted together and preferably at a point 18 represented by either end mark, such as the 100 mark on each of the scales, or where the scale lines 12 and 16 come to an apex. This pivotal connection between the arms may be made of any suitable construction, such as an aluminum or brass tubular eyelet 20, passing through holes suitably provided in the two members 10 and 14, and then pressed and deformed into position to provide flanges gripping the sides of the members, and these may be the same as fasteners used to hold together pieces of paper in the stationery industry, as shown in fragmentary detail in Fig. 2.

The base of the triangle formed by lines 12 and 16, of which the point 18 is the apex, is of variable length, in accordance with the pivotal adjustment of the two swinging arms. The arm 14 is pivotally mounted on an eyelet 22, similar to the construction of eyelet 20, which is secured in a base member 24, also made of transparent Celluloid or the like. The base is provided with a narrow slot 26 within which slides a further eyelet 28. One flanged head of the eyelet engages one side of the base member. The shank of the eyelet passes through the slot and secures the swinging arm 10 in position by means of a further flanged head thereon. The eyelets 22 and 28 are preferably located with their centers in line with the lines 16 and 12 respectively of the scale arms, so that those two lines, together with the imaginary base line connecting the centers of the eyelets 22 and 28, form a triangle of variable base length.

A movable indicator arm 32 is provided with an indicating line 34, and this arm is made of transparent material, such as Celluloid, and so arranged that it may ride over the other two arms 10 and 14. For this purpose, the indicator arm is pivotally mounted on the base 24 by means of another metal eyelet 36 mounted the same as the eyelet 20 in that it passes through the arm 32 and the base member and permits pivotal movement therebetween. In order to permit manipulation of the various arms, the indicator arm 32 and the scale arm 14 are preferably mounted on the front of the base, while the swinging scale arm 10 is mounted at the rear of the base 24.

The slot 26 is made long enough so that the arm 10 may be moved to the left so that its scale line 12 will coincide with the indicator line 34. Also, the slot 26 in the base 24 may be of any desired length, except that it should be considerably shorter than the sum of the lengths of the scales 12 and 16, so that those two scale lines will always form the sides of a triangle in any adjusted position of those two arms. The arm 32 will of course be made long enough to intersect the scale lines 12 and 16 at their remote ends. The axis of the pivot 36 should theoretically be in line with the centers of the eyelets 22 and 28 or the base line therebetween which passes through the slot 26, but for convenience of use, in permitting the line 12 on arm 10 to swing into alignment with the indicator line 34, this pivotal point 36 is placed out of such alignment, and adjustments are made in the marks on the scales so as to minimize the error thus introduced. That is, the zero marks on the two scale arms 10 and 14 are located in line with the center of the pivot 36, so that the indicator line 34 may be moved to substantially coincide with both of these zero marks when the arms 10 and 14 are in their most used positions, as illustrated.

Figure 3:
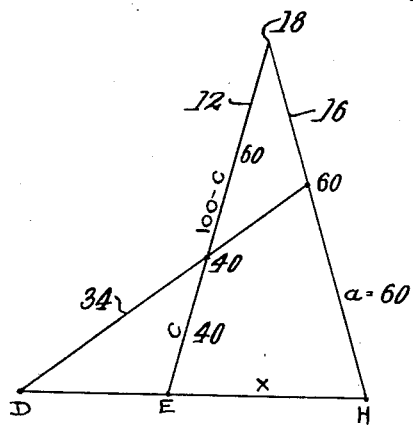
Figs. 3 and 4 are diagrammatic views of the scale lines, base line and indicator line illustrating the operation and use of the device.
Figure 4:
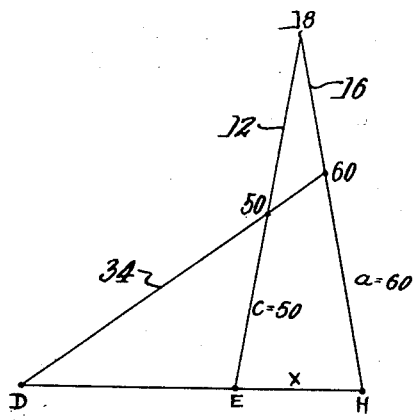

It will now be seen by reference to the diagrammatic views in Figs. 3 and 4, that the two pivoted arms 10 and 14 may be moved relative to each other so that any mark, such as 40 or 50, on the scale line 12 may be brought by the indicator line 34 into line with any chosen mark, such as 60 on the adjusted scale 16. This adjustment of the device corresponds with the desire of a teacher to change a grade mark 40, as shown in Fig. 3, or 50, as shown in Fig. 4, on an examination paper to 60. That is, he may arbitrarily choose to call the mark 40, for example, on the set of examination papers the same as the pass mark 60 normally used. Then by means of the device he may calculate what the other pupils' marks should be on the two scales. To do this he adjusts the two pivoted arms 10 and 14 until the indicator line 34 intersects the lines 12 and 16 at 40 and 60 respectively. Then to regrade the other examination marks, he swings the scale arm 32 to bring the scale line 34 into line with any given initial mark, such as 50, on the scale arm 10. At the intersection of the indicator line and the scale line 16 he will read a mark of about 69.5 as being the adjusted mark of the pupil's paper initially graded 50. Similarly, by again swinging the indicator arm, he will find that the initial mark 60 may now be converted to the adjusted mark 77, the initial mark 70 becomes an adjusted mark 84, the initial mark 80 becomes substantially 90, while the initial mark 90 becomes 95.

There are various ways of determining the initial adjustment. For example, if the grades of a test arranged in descending order were 92, 88, 85, 82, 78, 72, 69, 67, 66, 65, 64, 63, 61, 58, 56, 55, 52, 50, 48, 46, 40 and 35, the average would be 63. Now the average score should be the middle of the C group, or 75 in most systems. The teacher may then proceed as follows: With the thumb and index finger of the right hand, he holds the center line of the swinging indicator arm over 75 on scale 16. With the left hand, he moves scale 12 until the class average of 63 appears under the center line of the indicator arm. Now the class average 63 is compared to what the class average ought to be. To find what the passing mark is to be, he moves the indicator down to 60 on scale 16 and reads 46 on scale 12. Each of the grades may now be regraded from scale 12 to scale 16. A few comparisons are:

| Initial scores | 92 | 67 | 61 | 52 | 46 | 40 | 35 | 0 |
| --- | --- | --- | --- | --- | --- | --- | --- | --- |
| Adjusted scores | 95 | 78 | 73 | 65 | 60 | 54 | 49 | 0 |

The median or middle score may be used in place of the mean or average score for the middle of the C group.

The teacher may also employ the percentage method. The correct percentage of failures varies in different groups, but it is usually between 5% and 15% or more. In the above group of 23 marks, 9% would involve 2 failures and 13% would involve 3 failures. If there were to be 9% of failures, 46 would be the passing mark; and if 13%, 48 would be the passing mark. The following procedure would be used: Hold the middle line of the swinging indicator arm over 60 (or the school's passing mark) on scale 16, with the thumb and index finger of the right hand. Then, move scale 12 until the chosen passing mark comes under the indicator. Now the two passing marks are compared, and any of the original grades on scale 12 will be read as adjusted marks on scale 16.

The conversion of marks by means of this device is based on the mathematical formula:

$$A = \frac{C}{1 - \frac{X}{100}(100-C)}$$

That is, if C is the original mark first given a pupil's paper, then 100-C represents what the pupil missed on his examination paper. As indicated in Figs. 3 and 4, the distance DHH is the base line of the triangle formed by the scale line 16 and the indicator line 34 associated therewith, and the distance $EH = X$ may be considered as a percentage of the distance DH. In the arrangement of Fig. 3, where the old mark 40 is compared with the new mark 60, this ratio is 5 to 9. In Fig. 4, the corresponding ratio is 1 to 3. These relationships hold good without regard to the length of the base line or the lengths of the arms 10 and 14. Hence, in the above formula, the adjusted mark equals the initially assigned mark C divided by 1 minus X% of the length of the base line multiplied by the number of points missed by the pupil in his examination. This formula applies for marks near the 0 and 100 marks of the scale as well as the intermediate points, and all of the pupils may be treated alike.

It will now be appreciated that this device is not limited in its use to the regrading of school marks but may be used to translate any given set of numerical values into others in accordance with a mathematical formula. Hence, the above description is to be considered as illustrative of the general principles of the invention and of a specific application thereof and not as limiting the same except as defined by the claim appended hereto.

I claim:

A device comprising a base member forming the base of a triangle, a scale arm pivoted thereto and having a scale line forming a side of the triangle, a second scale arm pivoted to the outer free end of the other arm and having a scale line arranged to form the third side of the triangle, said scale arms being movable to form various shapes of triangles with different lengths of the base, and an indicator arm pivoted to the base at a point remote from the other pivoted arm and mounted to move across the scale arms so that an indicator line thereon may intersect points on the two scale lines, said parts being so arranged and related that a set of marks on one scale may be adjusted by a mathematical formula to give a corresponding set of marks on the other scale according to the positions of the various arms of the device.

DELMONT L. BALLARD.